INVENTORS
JULIAN N. KIRBY
RAYMOND G. GILLE
ATTORNEYS

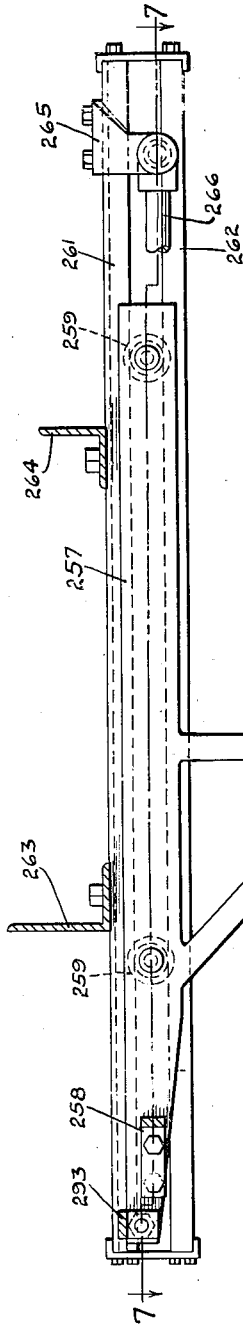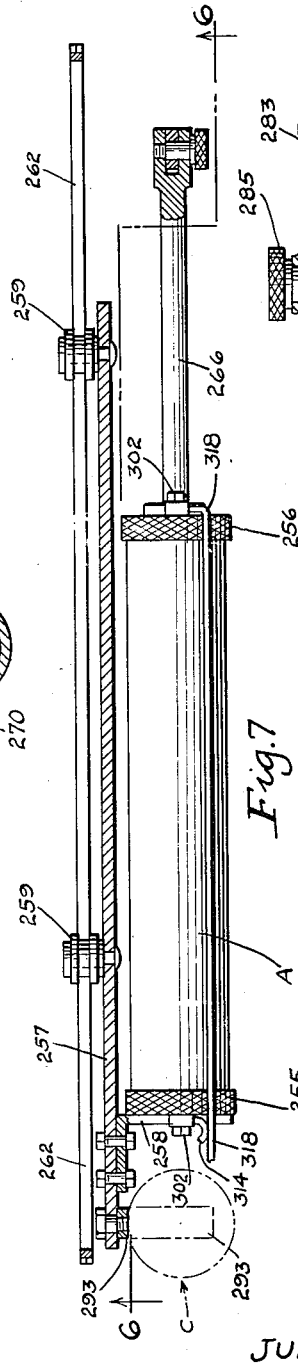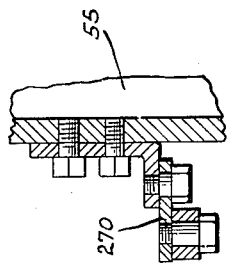

July 7, 1936.   J. N. KIRBY ET AL   2,046,563
WOOD CARVING MACHINE
Filed March 19, 1934   13 Sheets-Sheet 5
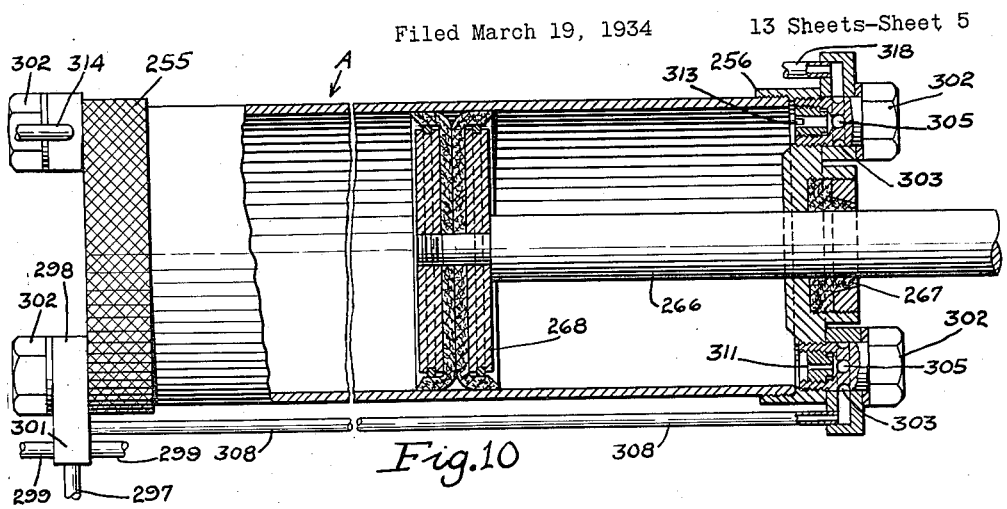
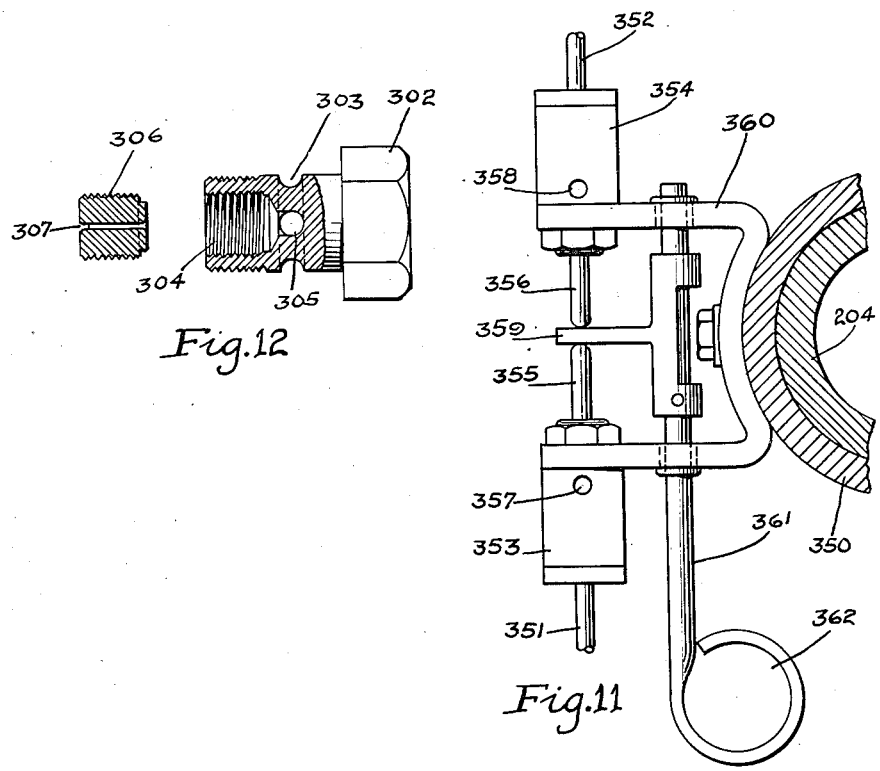
INVENTORS
JULIAN N. KIRBY
RAYMOND G. GILLE
By Paul, Paul Moore
ATTORNEYS

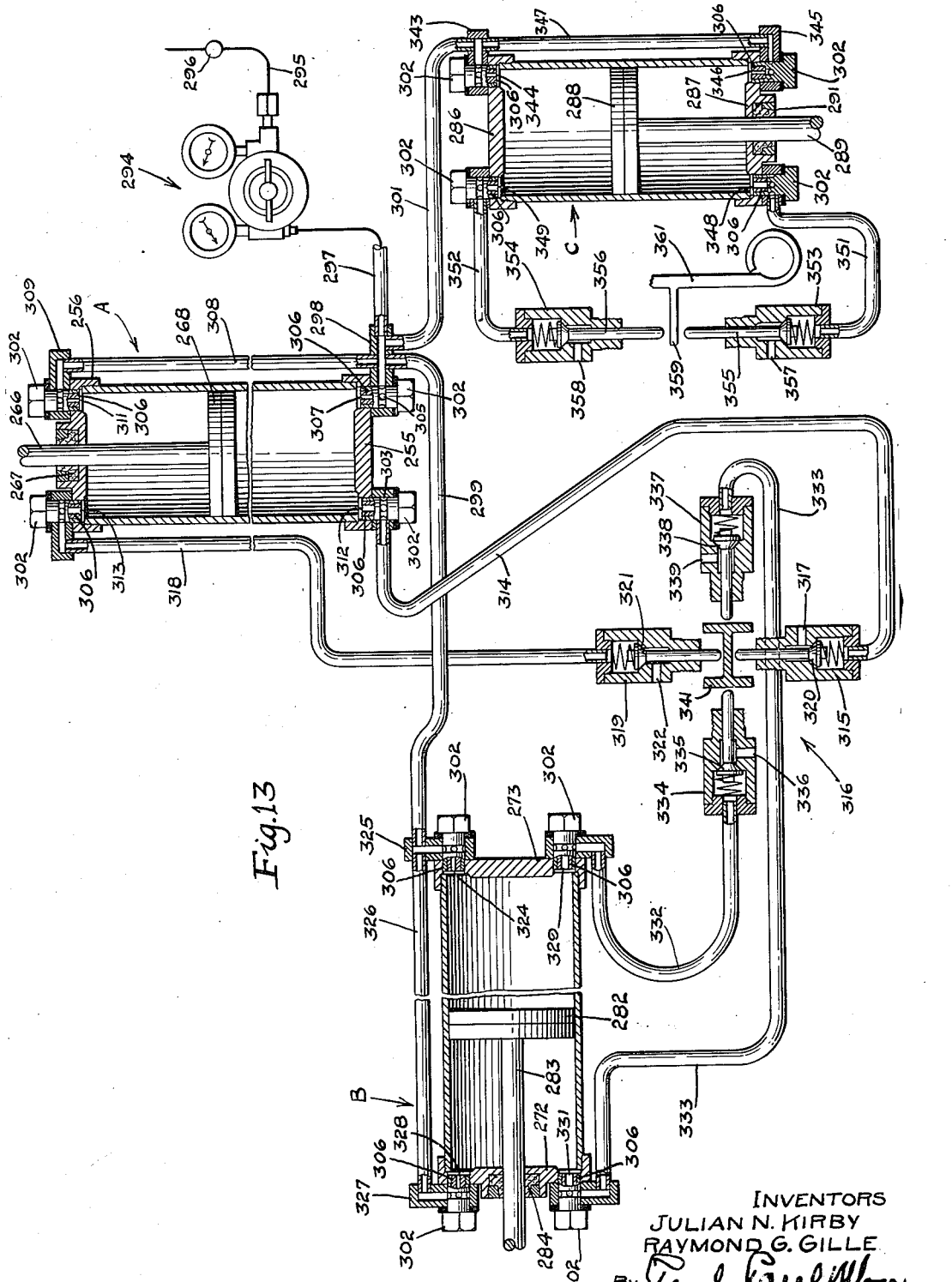

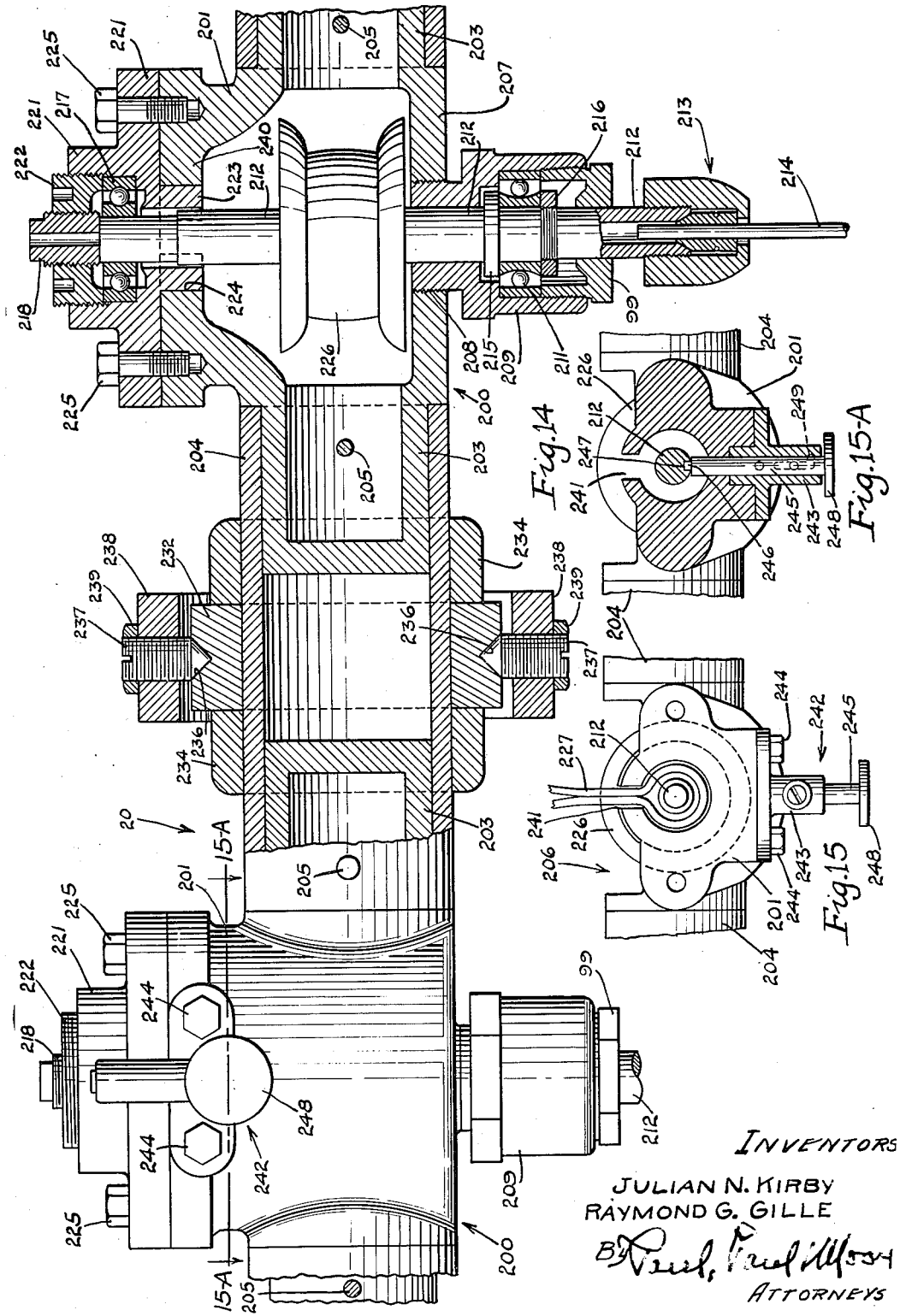

July 7, 1936.  J. N. KIRBY ET AL  2,046,563
WOOD CARVING MACHINE
Filed March 19, 1934    13 Sheets-Sheet 8
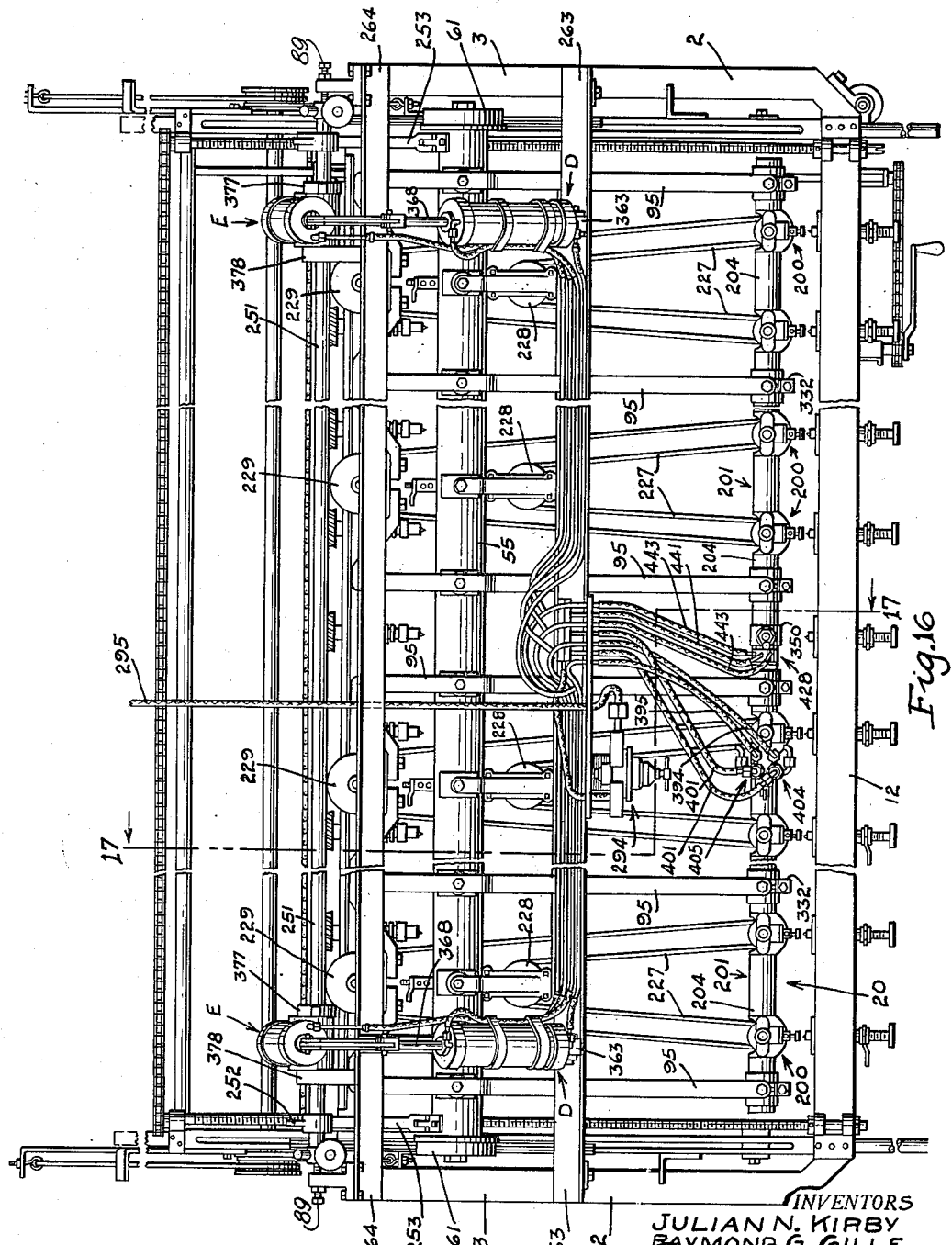
INVENTORS
JULIAN N. KIRBY
RAYMOND G. GILLE
BY
ATTORNEYS.

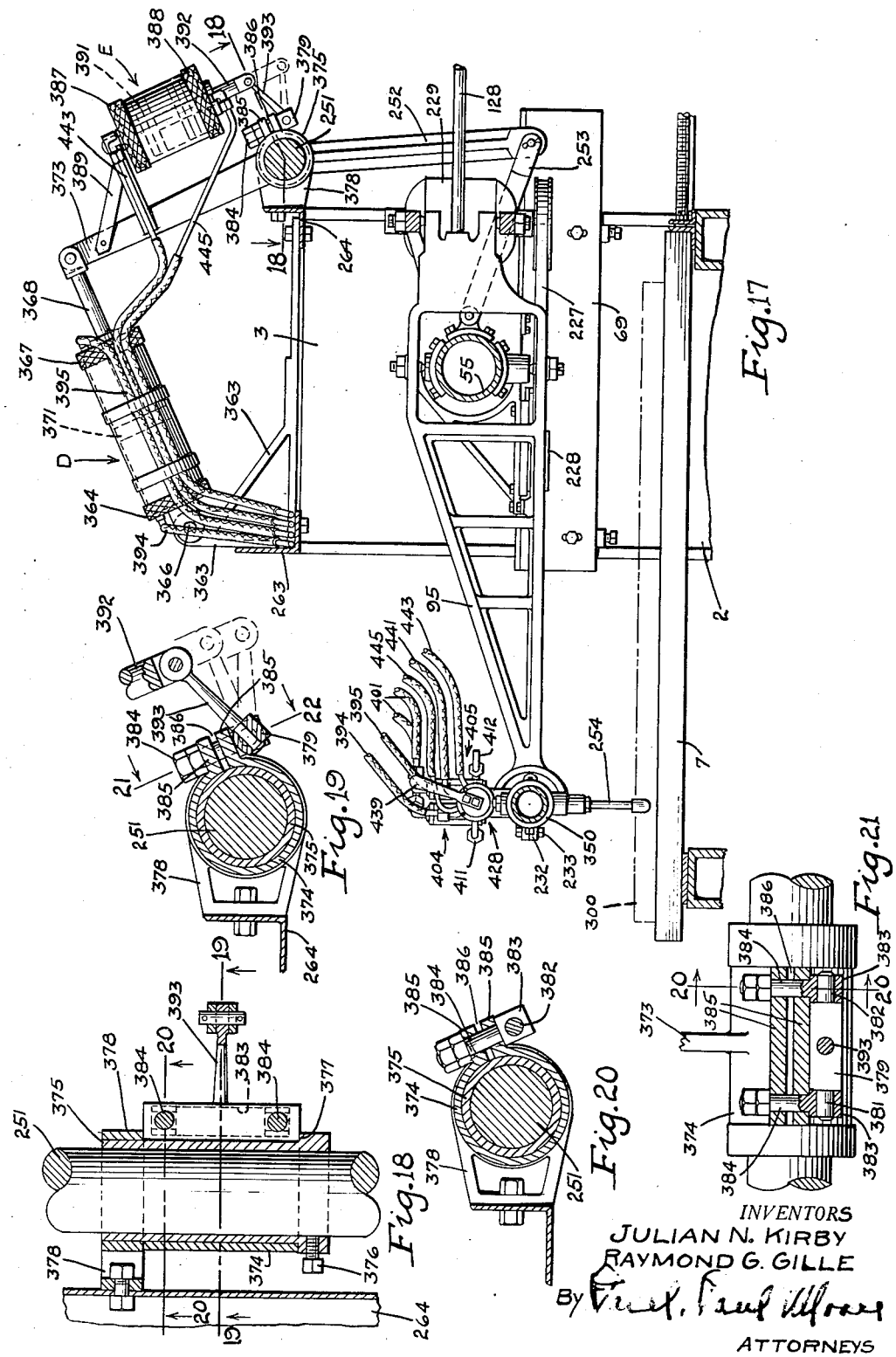

July 7, 1936.  J. N. KIRBY ET AL  2,046,563
WOOD CARVING MACHINE
Filed March 19, 1934  13 Sheets-Sheet 10
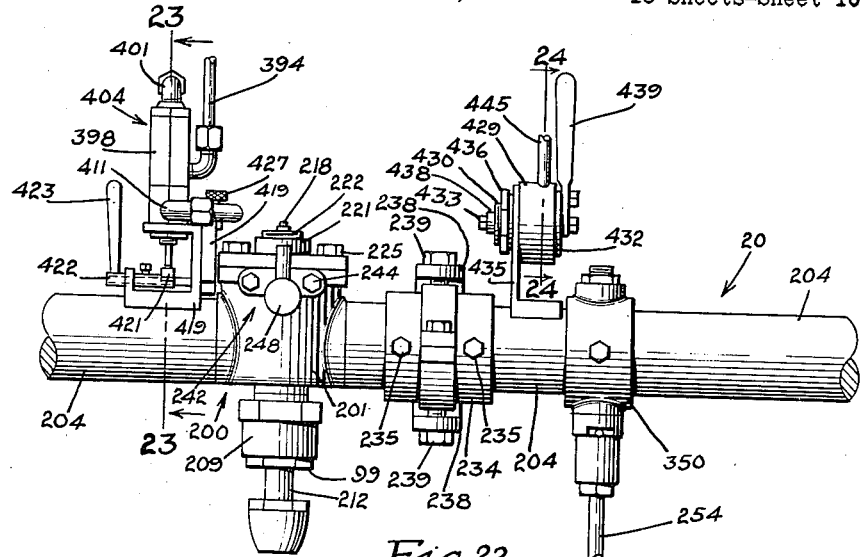
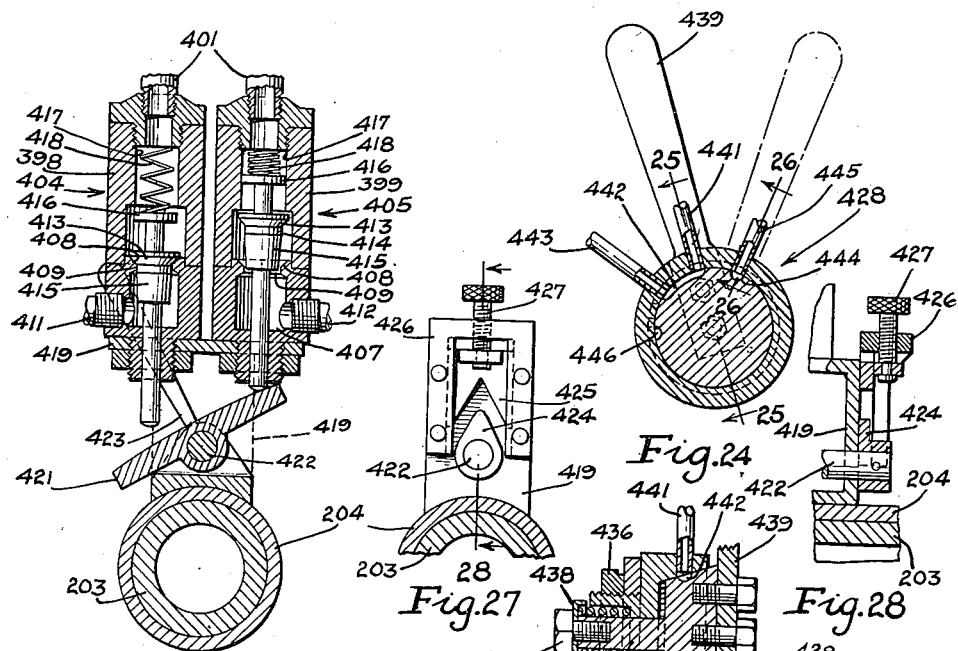
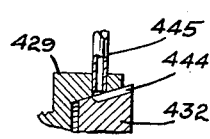
INVENTORS
JULIAN N. KIRBY
RAYMOND G. GILLE
By Paul, Paul Moss
ATTORNEYS

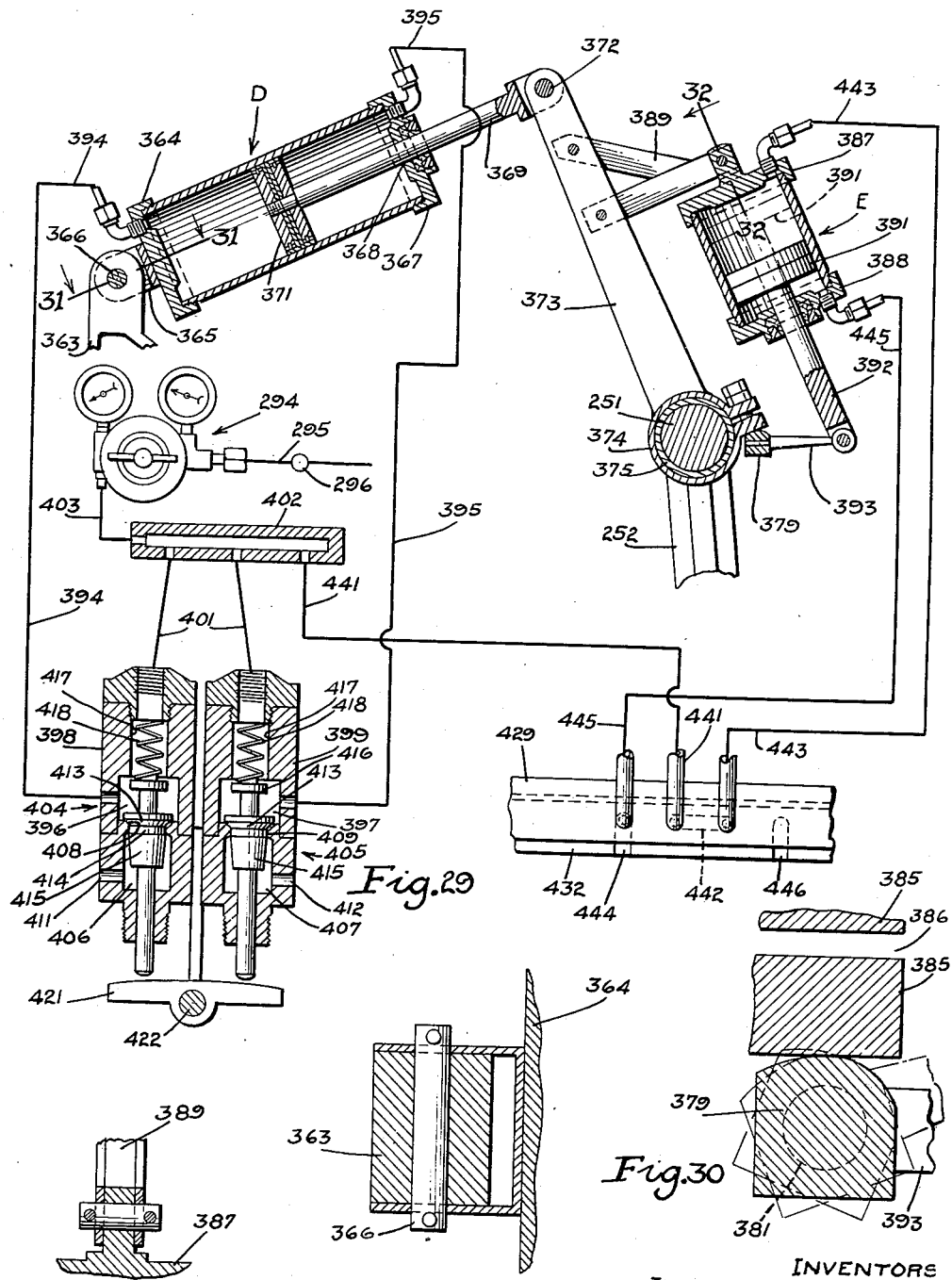

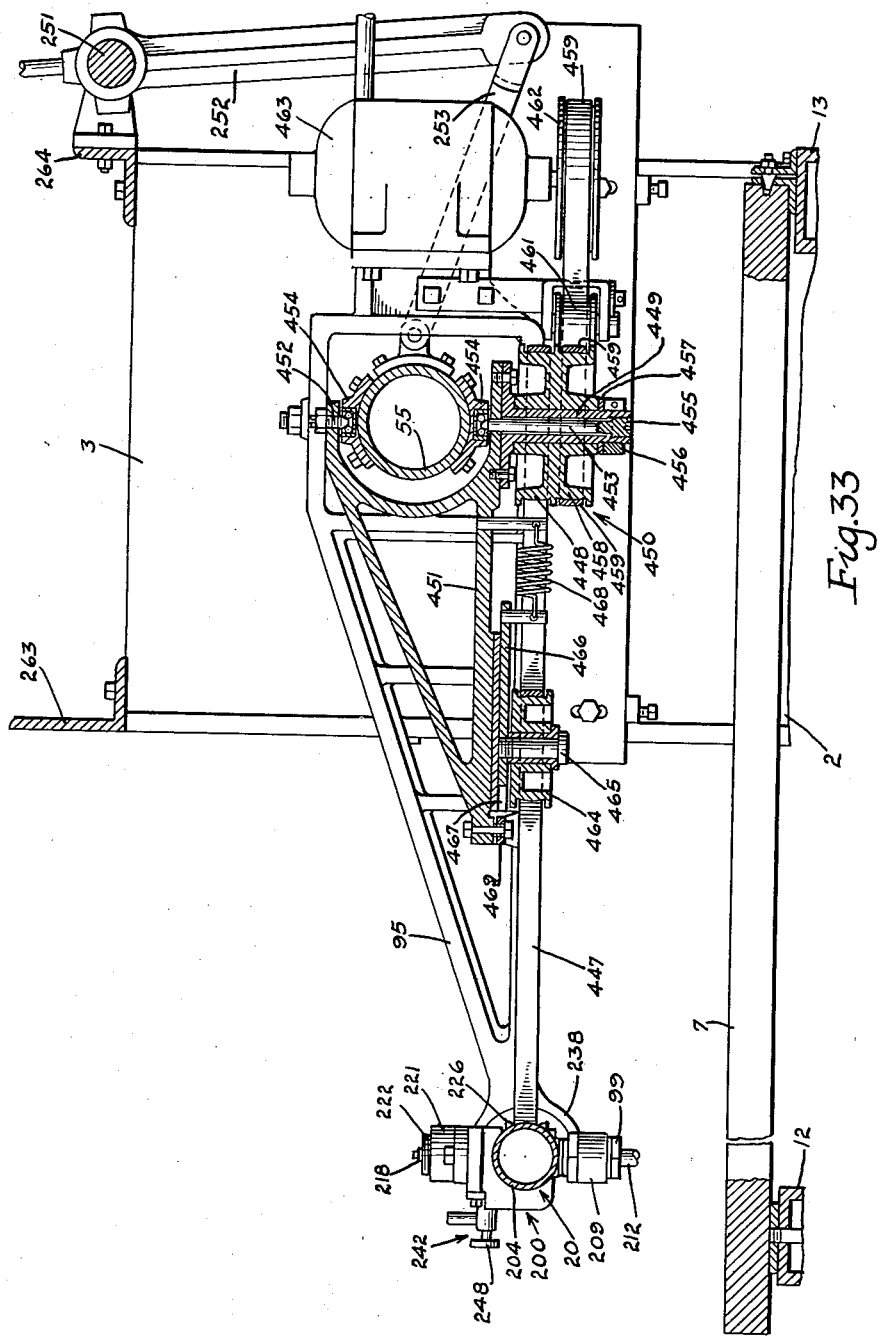

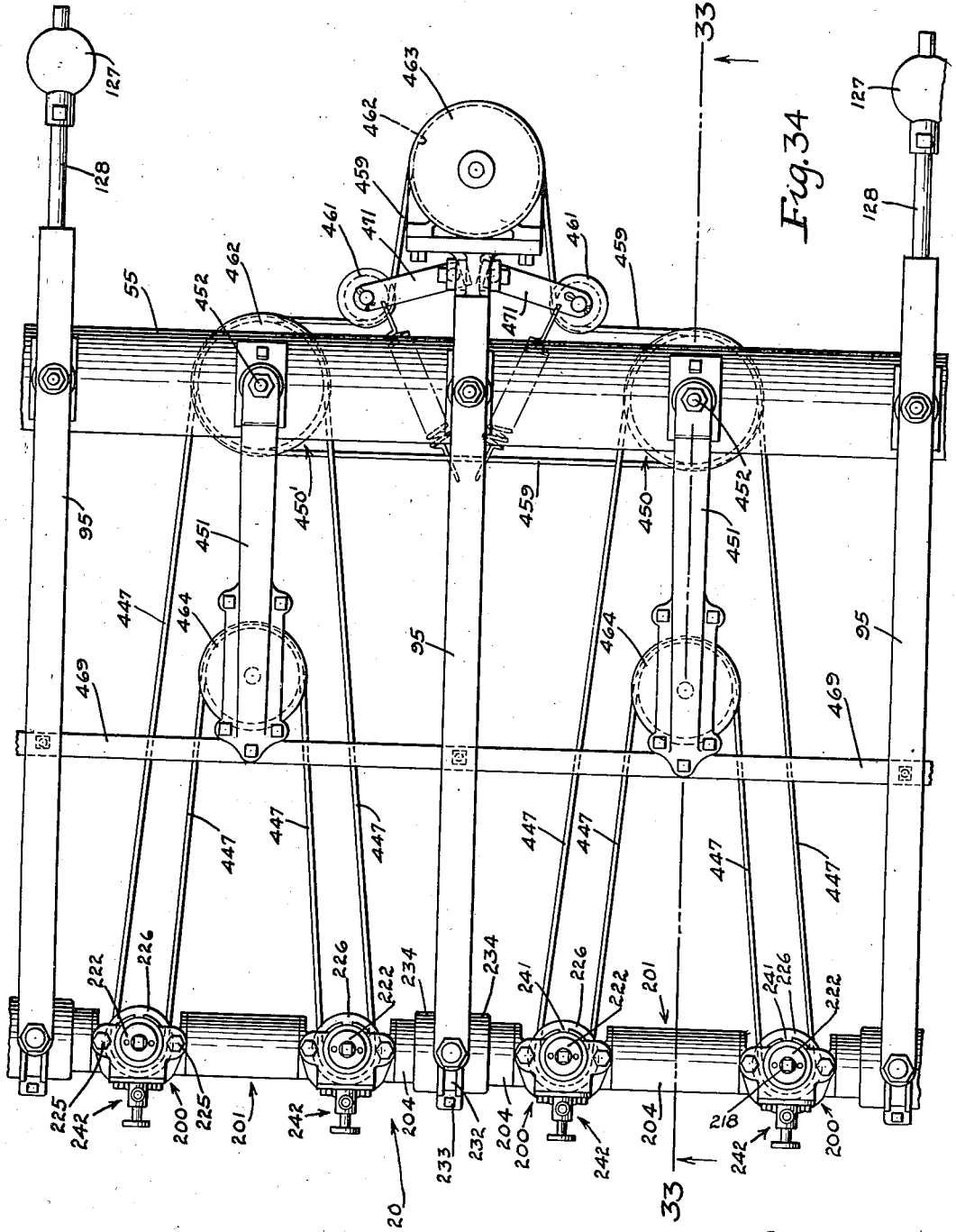

Patented July 7, 1936

2,046,563

UNITED STATES PATENT OFFICE 2,046,563

WOOD CARVING MACHINE

Julian N. Kirby and Raymond G. Gille, St. Paul, Minn.; said Gille assignor to said Kirby Application March 19, 1934, Serial No. 716,347

22 Claims. (Cl. 90—13.4)

This invention relates to new and useful improvements in wood carving machines of the general type disclosed in the pending application of Julian N. Kirby, No. 339,083, filed February 11, 1929.

An object of the present invention is to provide a wood carving machine of the multiple spindle type comprising a tool supporting bar having a plurality of spindles mounted thereon, and each adapted to support a tool, and said bar being adapted for universal movement over a suitable work supporting means or table, and provided with power operated means for relatively adjusting or moving said supporting bar with reference to the work.

Another object of the invention is to provide a wood carving machine comprising a tool-supporting bar mounted for universal movement over a work-supporting table, and having power operated means for relatively moving it with respect to the work.

A further object is to provide in combination with a wood carving machine comprising a plurality of spindles, a suitable control means for relatively adjusting the positions of said spindles with respect to the work supporting table, whereby the cutters supported by said spindles may be readily moved about in the work with a minimum of labor, and whereby the work is greatly expedited.

A further object is to provide a wood carving machine comprising a carriage mounted for traveling movement over the work supporting table of the machine and supporting a tool supporting bar, and fluid-operated means being provided in connection with said carriage and tool supporting bar, whereby they may be readily moved about over the table without manual labor.

A further object is to provide a wood carving machine comprising a carriage having mounted thereon a tool supporting bar adapted for swinging, horizontal, and vertical movements, and a plurality of fluid operated control elements being provided for controlling the operation of said carriage and tool supporting bar.

Other objects of the invention resides in the construction of the novel power operated means provided for translating the carriage over the work-supporting table, and for horizontally and vertically moving the cutting bar with respect to said carriage; in the specific construction of the control means, whereby an operator stationed adjacent to the machine may readily control all of the movements of the tool supporting bar by the simple manipulation of a plurality of small control elements conveniently located upon the machine; in the novel construction and arrangement of the cylinders and plungers used in the construction of the control mechanism, whereby the tools supported by the cutter or tool-supporting bar are moved or fed into the work by power operated means, said power operated means being controlled by a plurality of control elements conveniently located upon the machine; in the novel manner in which the fluid operated control means is designed and constructed, whereby the fluid-operated control means of the carriage and tool supporting bar may be controlled by the simple manipulation of a plurality of small triggers or control elements, conveniently located upon the machine; in the construction of the novel tool supporting bar mounted on the carriage and which is constructed of a plurality of interconnected sections, whereby its overall length may be varied; and, in the particular arrangement of the cylinders upon the machine frame, and, in the manner of connecting them to the arms supporting the tool supporting bar and whereby said bar may readily be moved about over the work with a minimum of labor; and, in the provision of a novel belt drive wherein four or more tool supporting spindles may be operated from a single motor, and in the general construction and arrangement of the various parts and mechanisms of the machine.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the drawings:

Figure 6 is a detail sectional view showing the means for supporting the cylinder and plunger which move the cutter bar forwardly and backwardly over the table;

Figure 7 is a longitudinal sectional view on the line 7—7 of Figure 6;

Figure 8 is an enlarged detail sectional view on the line 8—8 of Figure 6;

Figure 9 is a detail sectional view on the line 9—9 of Figure 1, showing the connection between the piston rod and the machine frame;

Figure 10 is a detail sectional view on a larger scale, showing the construction of one of the cylinders of the fluid operated mechanism;

Figure 11 is an enlarged detail sectional view showing the means for actuating the air control valves of the cylinder for operating the cutter bar vertically;

Figure 12 is an enlarged detail sectional view showing one of the devices for controlling the flow of air to and from the cylinders;

Figure 13 is a diagrammatic view showing the connections between the cylinders which cooperate to control the operation of the tool supporting bar with respect to the work, by the simple manipulation of a plurality of control elements;

Figure 14 is an enlarged detail sectional view showing a portion of the cutter bar and the manner of supporting the tool spindles therein;

Figure 15 is a detail sectional plan view of one of the cutter heads, on a smaller scale, with the upper part thereof removed;

Figure 15A is a detail sectional view on the line 15A—15A of Figure 14, showing the means for locking the spindles against rotation;

Figure 16 is a plan view of a machine similar to that shown in Figure 1, but showing a control means of somewhat different construction;

Figure 17 is a vertical sectional view on the line 17—17 of Figure 16, showing a portion of the machine and the novel manner of mounting thereon, the fluid operated control means for moving the cutter bar in forward and backward positions;

Figure 18 is an enlarged detail sectional plan view on the line 18—18 of Figure 17;

Figure 19 is a detail sectional view on the line 19—19 of Figure 18;

Figure 20 is a detail sectional view on the line 20—20 of Figures 18 and 21;

Figure 21 is a detail sectional view on the line 21—21 of Figure 19;

Figure 22 is a view showing a portion of the tool supporting bar;

Figure 23 is an enlarged detail sectional view on the line 23—23 of Figure 22, showing the preferred construction of the valve mechanism for controlling the backward and forward movements of the cylinder;

Figure 24 is a detail sectional view on the line 24—24 of Figure 22;

Figure 25 is a detail sectional view on the line 25—25 of Figure 24;

Figure 26 is a detail sectional view on the line 26—26 of Figure 24;

Figure 27 is a detail sectional view showing the means for controlling opening of the valves shown in Figure 23;

Figure 28 is a detail sectional view on the line 28—28 of Figure 27;

Figure 29 is a diagrammatic view showing the connections between the valves and cylinders used in the construction shown in Figures 16 and 17;

Figure 30 is an enlarged detail sectional view;

Figure 31 is an enlarged detail sectional view on the line 31—31 of Figure 29;

Figure 32 is a detail sectional view on the line 32—32 of Figure 29;

Figure 33 is a detail sectional view on the line 33—33 of Figure 34, showing a unique drive for the spindles; and Figure 34 is a plan view of Figure 33.

Main frame

Figure 1:
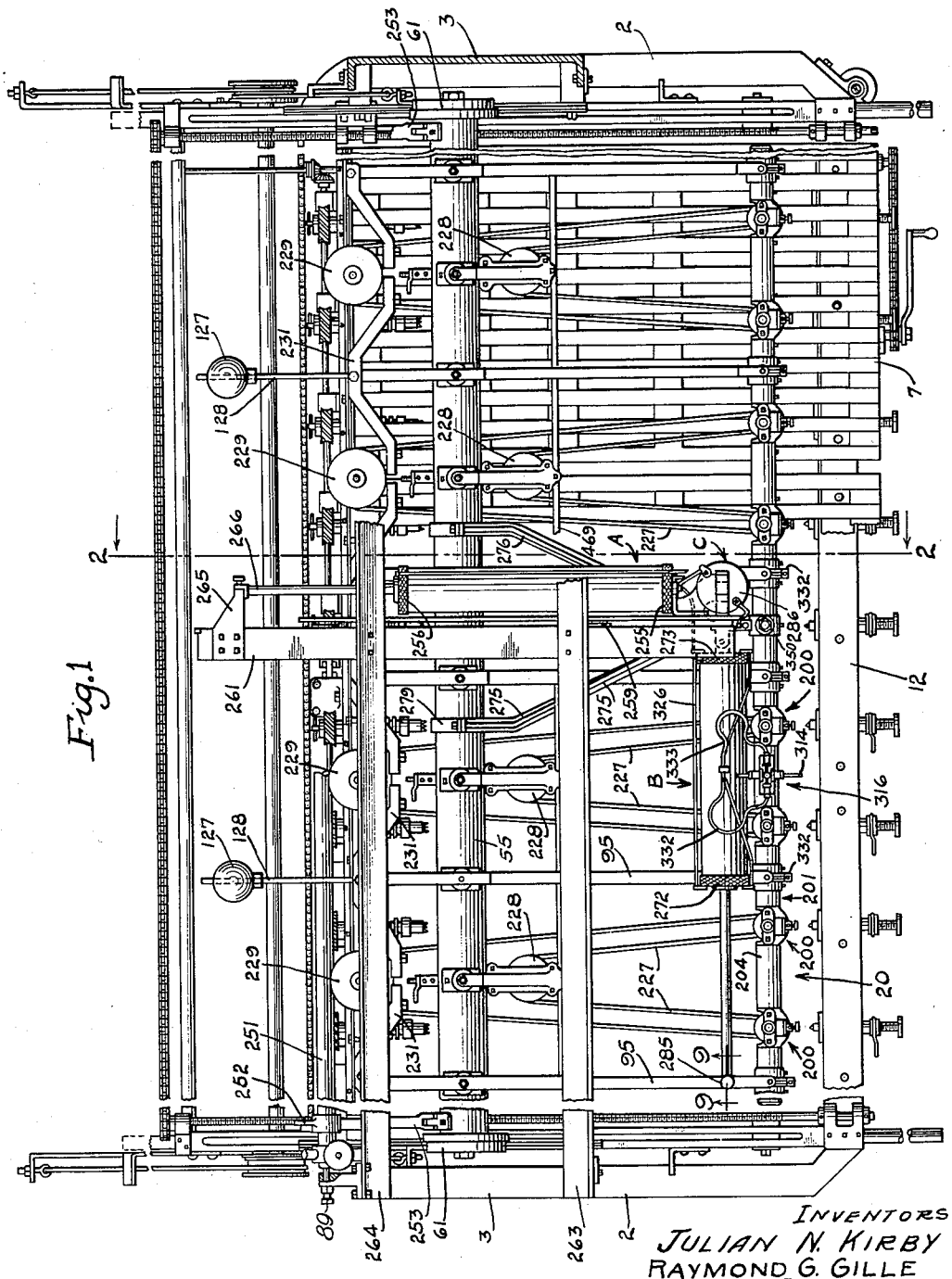
Figure 1 is a plan view of a wood carving machine showing the invention embodied in the construction thereof.
Figure 2:
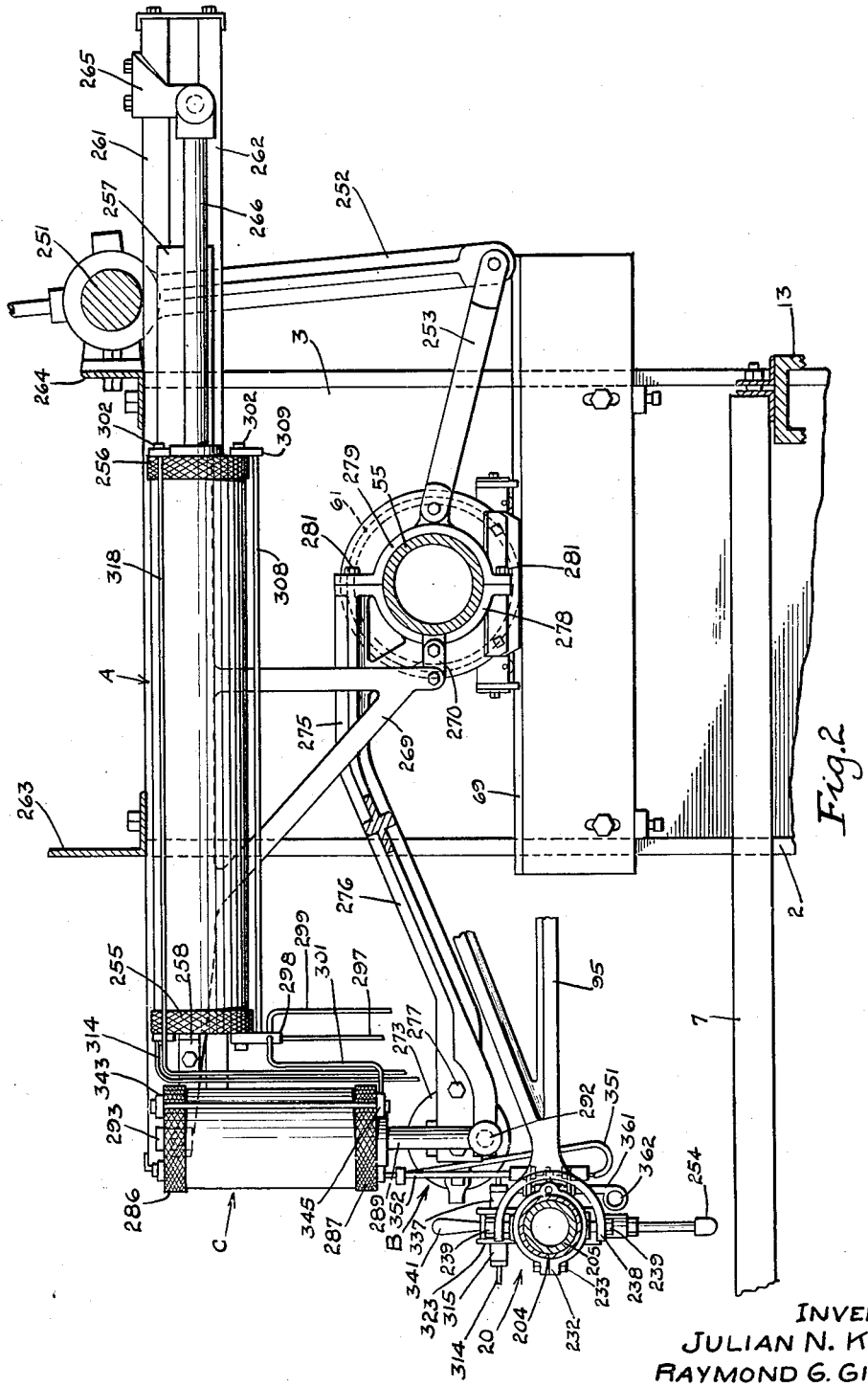
Figure 2 is an enlarged detail sectional view on the line 2—2 of Figure 1, with some of the parts omitted, and showing the novel means provided for relatively adjusting the position of the tool supporting bar with respect to the work.

In the selected embodiment of the invention here shown, there is illustrated in Figures 1 and 2, for purposes of disclosure, a portion of a wood carving machine, such as the one disclosed in the pending application, hereinbefore mentioned, comprising a main frame structure including end members 2, and front and rear supporting beams 12 and 13, upon which a work-supporting table, preferably composed of a plurality of removable sections 7, is supported. The beams 12 and 13 are adapted for vertical and horizontal adjustments by suitable means, not shown. The lower portion of the machine is substantially the same as that shown and described in the pending application, above referred to, and it is therefore thought unnecessary to herein show and describe the same in detail. The present invention relates primarily to the construction of the upper portion of the machine including the tool supporting bar, the power means for operating the carriage, and the spindle drive.

Tool supporting bar

The tool supporting bar, generally indicated by the numeral 20, is supported by a plurality of spaced arms 95, pivotally supported upon a tubular member 55 disposed lengthwise of the machine, and having flanged wheels 61 at its ends adapted to travel on suitable rails or tracks 69, secured to the upstanding frame portions 3 of the main frame of the machine, as best shown in Figure 2. The tubular member 55, arms 95, and tool supporting bar 20, are thus operatively connected together, and for the purpose of explanation, will hereinafter be referred to as the carriage. Certain of the arms 95 may be provided with rearwardly extending rods 128 adapted to support suitable counter weights 127. These counterweights are used when it is found necessary to provide additional means for counterbalancing the weight of the tool-supporting bar 20 at the front of the carriage.

The carriage is mounted for forward and backward movement over the table 7, and the cutter bar is adapted for horizontal and vertical movements with respect thereto, the pivotal connections of the arms 95 with the tubular member 55 permitting the cutter bar to be moved lengthwise of the table, and by rocking the member 55 about its axis, the cutter bar is moved vertically. It will thus be seen that the tool supporting bar is mounted for universal movement over the table.

Figure 3:
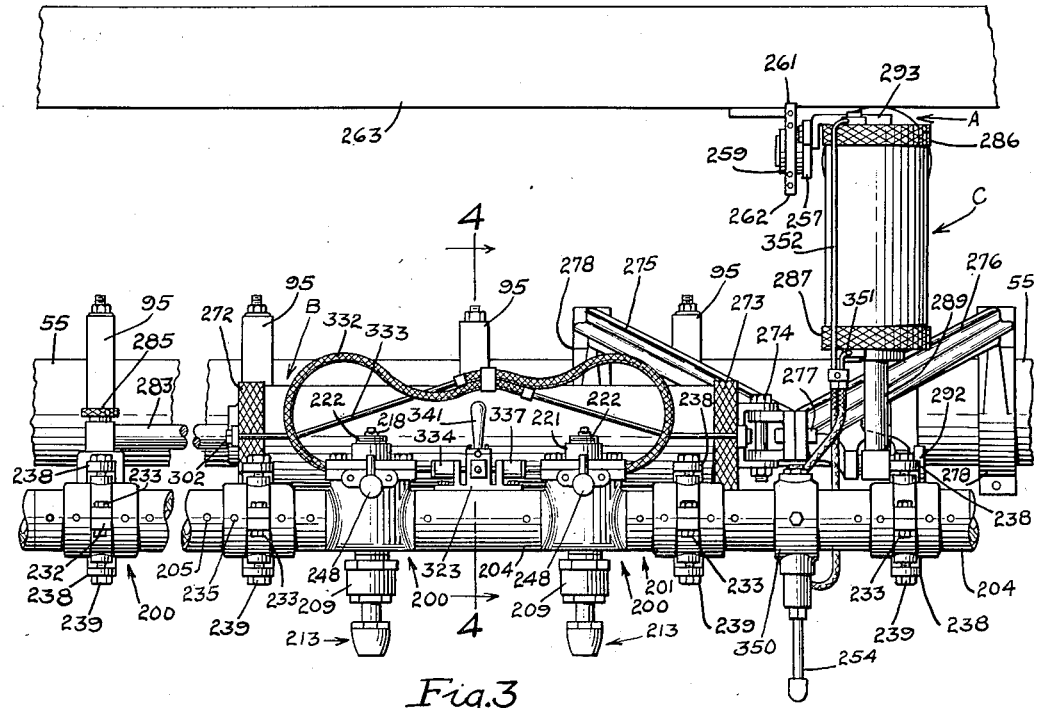
Figure 3 is a front elevation of a portion of the machine, showing the tool supporting bar and the manner of mounting the tool supporting spindles thereon.

An important feature of this invention resides in the novel construction of the cutter bar 20, which, as shown in Figures 3 and 14, comprises a plurality of cutter heads, generally indicated by the numerals 200. As all of the cutter heads are alike in construction, but one will be described in detail. Each cutter head comprises a main body portion 201, having oppositely extending cylindrical extensions 203 secured in the ends of tubular connectors 204, whereby the cutter heads and said connectors are secured together as a unit, and thus cooperate to provide the cutter bar, hereinbefore mentioned. Suitable pins 205 fixedly secure the cylindrical extensions 203 in the ends of the tubular connectors 204. The body portion 201 of each cutter head is open at its rear side, as best shown at 206 in Figure 15, and its lower wall 207 has a threaded aperture 208 adapted to receive a bearing cup 209, shown having an antifriction bearing 211 mounted therein. This bearing supports a tool spindle 212, the lower end of which is provided with a suitable chuck 213 adapted to receive a suitable tool 214, as shown in Figure 14. The inner race of the bearing 211 is clamped between an annular flange 215, provided upon the spindle 212, and a lock nut 216 received in threaded engagement with the spindle. A member 99 is received in threaded engagement with the walls of the bearing cup 209 and removably secures the bearing 211 therein.

The upper end of the spindle 212 is supported in a suitable bearing 217, mounted in a cup 221, and is secured therein by a suitable nut 222. A thrust plug 218 is received in threaded engagement with the nut 222, and has its lowering end engaging the adjacent end of the spindle 212, to thereby take the thrust which may be exerted against the spindle. The cup 221 has a depending cylindrical portion 223 fitting in an aperture 224 in the upper wall of the body portion 201, thereby to axially aline the upper bearing 217 with the lower bearing 211. The cap 221 is shown secured to the body portion 201 by suitable bolts 225. A flanged pulley 226 is suitably secured to the spindle 212 within the body portion 201, and is adapted to receive a belt 227, which, in Figure 16, is shown having a running connection with a suitable belt tightener 228 and a drive motor 229. The motor 229 is shown supported upon brackets 231, pivotally secured to the rear end portions of the arms 95, as best shown in Figure 1, whereby the weight of the motor 229 acts to counterbalance a portion of the weight of the cutter bar 20.

The cutter bar, as hereinbefore stated, is pivotally supported on the arms 95, and to thus support the cutter bar, suitable collars 232 are secured to certain of the connectors 204, as best shown in Figures 2 and 14. The collars 232 are preferably split, as shown in Figure 2, whereby they may be securely clamped to their respective connectors by suitable bolts 233. Annular rings 234 are secured to the connectors adjacent to the collars 232, by such means as set screws 235, to prevent longitudinal movement of the cutter bar with respect to the arms 95.

Each collar 232 is shown provided with conical depressions 236 diametrically disposed and adapted to receive the terminals of pivot screws 237 received in threaded engagement with the end portions of forks 238, shown integrally formed with the forward ends of the arms 95, as best shown in Figure 2. The pivot screws 237 are adjustably supported in the forks 238 and are secured in adjusted positions by suitable lock nuts 239. By thus supporting the cutter bar upon the arms 95, it is adapted for pivotal movement with respect thereto and it may also be relatively adjusted to vertically position the spindles 212, by simply loosening the bolt 233, whereby the cutter bar may be relatively rotated in the collars 232. When in operation, the collars 232 are fixedly secured to their respective connectors 204, so that the spindles are retained in a substantially vertical position, or the collars 232 may be left loose on the connectors 204, so that the spindles can be tilted in a forward or backward direction to allow for under cutting. It is also to be noted that the cutter bar may be quickly detached from the supporting arms by simply loosening the pivot screws 237 and removing the belts 227 from their respective pulleys 226.

By constructing the cutter bar 20, as above described, the spacing between the cutter heads may be varied by simply changing the connectors 204 between adjacent cutter heads. In other words, if the cutter bar is to be used on a machine wherein the cutter heads are to be spaced relatively close together, shorter connectors are used between the cutter heads and, conversely, when the cutter bar is to be used on a machine in which the spindles are to be spaced apart relatively greater distances, longer connectors are used between adjacent cutter heads. It is also to be noted that all of the cutter heads of the cutter bar are identical in construction, which simplifies the manufacture of the apparatus.

The upper wall 240 of the body portion of each cutter head, as hereinbefore stated, is provided with an aperture 224 which receives the cylindrical extensions 223 of the caps 221, and each wall 240 is provided with a slot 241 at its rear portion which communicates with the aperture 224, as best shown in Figure 15. The slots 241 provide clearance for the belts 227 whereby they may readily be removed from the pulleys 226, when the caps 221 are detached from their respective cutter heads 201, as clearly shown in Figure 15. This is important in a structure of this character in that it permits the endless belts to be readily attached for repairs or replacement without opening or separating the connected ends of the belt.

When changing tools 214 in the chucks 213 of the spindles, it is desirable that means be provided for locking the spindle against rotation during the operation of thus changing the tools. This is accomplished by means of a locking device, generally indicated by the numeral 242, in Figures 1, 14, 15, 15A, and 34, and comprises a suitable housing 243, shown detachably secured to each cutter head by bolts 244. A locking bolt 245 is mounted in each housing 243. The terminals 246 of these locking bolts are adapted to engage recesses 247 provided in the spindles 212, as shown in Figure 15A. The locking bolts 245 have heads 248 whereby they may be conveniently manipulated. Suitable means such as indicated at 249 in Figure 15A, are provided for securing the locking bolts 245 in inoperative position.

In machines of the type herein disclosed, it is essential that the axis of the cutter bar is always maintained parallel to the longitudinal centerline of the machine frame or, in other words, to the supporting beams 12 and 13 upon which the table is mounted. To thus guide the cutter bar, an equalizer bar 251 is mounted in suitable bearings secured to the upright frame portions of the main frame. Suitable screws 89 engage the terminals of the equalizer bar 251 to prevent it from moving longitudinally in its bearings. A pair of depending arms 252 are fixedly secured to the equalizer bar and have links 253 connecting the lower ends thereof to the tubular member 55 of the carriage, as best shown in Figure 2. By thus connecting the tubular member to the equalizer bar 251, the carriage may be moved freely backwardly and forwardly and the cutter bar will always be maintained in parallel relation to the supporting beams 12 and 13 of the machine frame, and to the tubular member 55.

Three cylinder control

Another important feature of this invention resides in the means provided whereby the carriage may be operated by power, when desired. Wood carving machines comprising a large number of spindles are often difficult to handle manually, especially if the spindles are equipped with large roughing cutters. When such cutters are used on a multiple spindle machine, considerable pressure must be applied to the follower 254, shown in Figures 2, 3, and 17, to hold it firmly against the pattern 300, indicated in dotted lines in Figure 17. It is well understood that to insure uniform and accurate work, the follower must be held firmly against the guiding surface of the pattern 300 in order that every piece of work being operated upon will be identically shaped or formed in accordance with the pattern, when finished. To thus manually hold the tracer or follower against the guiding surfaces of the pattern is usually very tiring, whereby the operator must stop at intervals to rest before he can proceed further with the work. This naturally retards the work with a resultant increase in the cost of production.

To overcome this objection, there is provided means whereby the actual work of moving the cutter bar may be accomplished by power, so that the operator need only guide the tracer or follower 254 over the pattern, the work or energy required to force the cutting elements into the work being done entirely by power. By thus relieving the operator of the manual labor of forcing the cutting elements into the work, greatly expedites the operation, with a corresponding decrease in the cost of production.

To thus operate the carriage by power, there is shown in Figures 1 and 2, a mechanism comprising a plurality of cylinders, A, B, and C. The cylinder A is shown provided with suitable heads 255 and 256 secured to the ends thereof by suitable screw threads. The head 255 of the cylinder A is secured to a frame 257 by a suitable bracket 258. The frame 257 has a pair of flanged rollers 259 which travel between spaced rails 261 and 262, fixedly secured to a pair of angle irons 263 and 264 secured to the upper frame portions 3 of the main frame. The spaced rails 261 and 262 extend rearwardly of the frame member 264, and a bracket 265 is shown secured to the rail 261 to which one end of a piston rod 266 is connected. The piston rod 266 traverses a packing gland 267 in the cylinder head 256, and has a suitable piston 268 secured to the inner end thereof which is mounted for reciprocal movement within the cylinder A.

The movable frame 257 has a depending portion 269 pivotally connected to the tubular member 55 of the carriage by means of a link 270, whereby when the cylinder A is moved with respect to the piston rod 266, the carriage will also be moved backwardly and forwardly with respect to the table, as will be readily understood by reference to Figure 2. It is also to be understood that the piston rod is mounted in fixed relation to the table so that when a suitable pressure fluid is released from one side of the piston in cylinder A, said cylinder will move with respect to the piston rod and thereby cause a corresponding movement to be imparted to the carriage.

The cylinder B provides means for moving the cutter bar lengthwise of the table or at right angles to the traveling movement of the carriage. This cylinder is provided at its ends with suitable heads 272 and 273, the latter being pivotally connected at 274 to the forward ends of a pair of diverging arms 275 and 276. The forward ends of the arms 275 and 276 are suitably secured together by bolts 277, as best shown in Figures 2 and 3. The arms 275 and 276 have their rear ends secured in fixed relation to the tubular member 55 of the carriage, whereby they become, in effect, a component part thereof. As shown in Figure 2, the rear ends of the arms 275 and 276 are provided with semi-circular collars 278 which cooperate with clamping elements 279 to securely grip the tubular member 55. The clamping members 279 are secured to the semi-circular collar elements 278 by suitable bolts 281.

A suitable piston 282 is mounted for reciprocal movement within the cylinder B and has a piston rod 283 traversing a suitable leak-proof guide opening 284 provided in the cylinder head 272. The opposite end of the piston rod 283 is pivotally connected at 285 to one of the arms 95 of the carriage. Thus, when the piston 282 is reciprocated within the cylinder B, the cutter bar will be moved in a direction lengthwise of the table, because of the cylinder being supported in fixed relation to the tubular member 55 of the carriage by means of the diverging arms 275 and 276.

Vertical movement is imparted to the cutter bar by the cylinder C. This cylinder is provided at its ends with suitable heads 286 and 287 and has a piston 288 mounted therein. A piston rod 289 has one end secured to the piston 288 and is slidably supported in a guide 291 provided in the cylinder head 287. The opposite end of this piston rod 289 is pivotally connected to the forward ends of the diverging arms 275 and 276, as indicated at 292 in Figure 2. The upper end of the cylinder C is pivotally connected to the movable frame 257, to which the cylinder A is secured by such means as a bracket 293. It will thus be seen that the cylinder C is supported upon the movable frame 257 and travels backwardly and forwardly with the cylinder A when the carriage is thus moved.

Air control means

Another important feature of this invention resides in the unique manner of controlling the flow of air to and from the various cylinders to operate the pistons thereof. In a wood carving machine, it is very essential that the cutter bar be so supported that it cannot chatter, when the cutting elements are fed into the work. The power operated control means, herein disclosed, is so constructed that the cutter bar is constantly supported in all directions by fluid pressure, whereby it is firmly held so that when the cutting elements are fed into the work, they cannot chatter, with the result that a smooth cut is obtained.

To thus support the cutter bar, each end of each cylinder is constantly in direct communication with a pressure fluid such as compressed air, which may be regulated or varied by a suitable pressure regulator of ordinary construction, generally indicated by the numeral 294 in Figure 13. A pipe 295 connects the pressure regulator with a suitable source of pressure fluid, not shown, and may be provided with a suitable shut-off valve 296. The opposite side of the pressure regulator has a pipe 297 connecting it with a branch fitting 298, which fitting has pipes 299 and 301 leading to the cylinders B and C, respectively, as shown in Figure 13.

A screw plug 302, best shown in Figure 12, is suitably mounted in the head 255 of the cylinder A, and has an annular groove 303 in its periphery communicating with a threaded socket 304 provided at the inner end of the plug 302 by means of a transverse air duct 305. A nozzle 306 having an intake orifice 307, is secured in the socket 304 whereby the orifice 307 communicates with the annular groove 303 provided in the periphery of the plug. The groove 303 is in direct communication with the air passage provided in the branch fitting 298, whereby air under pressure is delivered to the forward end of the cylinder through the restricted orifice 307.

A pipe 308 connects the branch fitting 298 to a fitting 309 suitably secured to the cylinder head 256. A similar plug 302 is mounted in the fitting 309 and has an intake orifice 311 therein which establishes communication between the interior of the opposite end of the cylinder and the pipe 308. The plug 302 secured in the cylinder head 256, is identical in construction to the plug shown in the cylinder head 255, which is shown in detail in Figure 12, and it will therefore be referred to by like numerals. By thus connecting the opposite ends of the cylinder with the fitting 298, the air pressure exerted against the opposite sides of the piston 268 will be equalized, whereby the piston will be positively held against movement. Exhaust orifices 312 and 313 are provided in similar plugs 302 secured to the cylinder heads 255 and 256, as shown. The exhaust orifice 312 communicates with one end of a pipe 314, the opposite end of which is connected to a small housing 315 of a control device, generally indicated by the numeral 316. The housing 315 of the control device 316 has a spring-actuated exhaust valve 320 mounted therein which normally closes an exhaust port 317, as shown in Figure 13. The exhaust orifice 313 at the opposite end of the cylinder A has a pipe 318 connecting it with a similar housing 319 of the control device 316. This latter housing 319 similarly contains an exhaust valve 321 normally closing an exhaust port 322. The housings 315 and 319 are supported in a suitable supporting structure 323 suitably secured to one of the connectors 204 of the cutter bar, as shown in Figures 3, 4, and 5.

The cylinder B is provided at one end with an intake orifice 324 provided in a plug 302 and communicating with a pipe 299 by means of a suitable fitting 325. A pipe 326 connects the fitting 325 with a fitting 327 at the opposite end of the cylinder. This latter fitting 327 has a similar plug 302 secured therein and provided with an intake orifice 328 which communicates with the pipe 326. It will thus be seen that air under pressure is supplied to both ends of the cylinder B, whereby the pressure against the opposite sides of the piston 282 is equalized, as in the piston A. Exhaust orifices 329 and 331 are provided in similar plugs 302 and communicate with pipes 332 and 333, respectively. The pipe 332 is connected to a similar housing 334 having an exhaust valve 335 mounted therein and normally closing an exhaust port 336. The pipe 333 is similarly connected to a housing 337 having a spring-actuated exhaust valve 338 connected therein and normally closing an exhaust port 339.

Figures 4, 5:
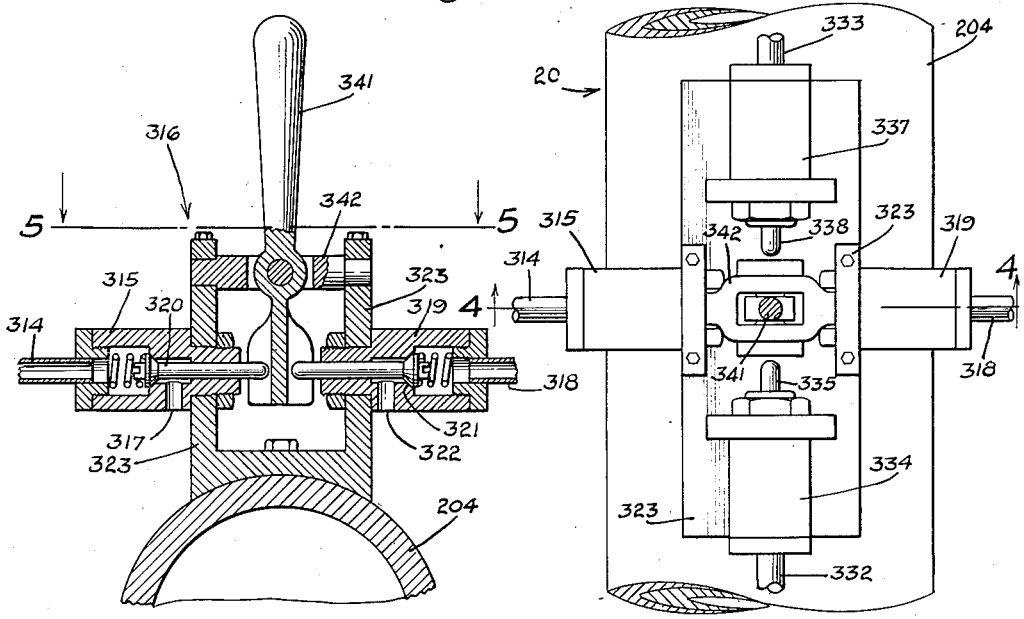
Figure 4 is an enlarged detail sectional view on the line 4—4 of Figure 3.
Figure 5 is a detail plan view showing the control mechanism mounted upon the tool supporting bar and whereby the tool supporting spindles or cutters may readily be guided in the work.

The stems of the exhaust valves 320, 321, 335, and 338 project beyond the adjacent ends of their respective housings, as clearly illustrated in Figures 4 and 13, and are adapted to be actuated by the lower end of a lever 341, mounted for pivotal movement in a member 342 which, in turn, is adapted for rocking movement in the supporting structure 323, as best shown in Figure 4. By thus supporting the lever 341, it may be selectively oscillated to actuate or open any one of the exhaust valves 320, 321, 335, and 338, as will readily be understood by reference to Figures 4 and 13. The lever may also be operated so as to simultaneously actuate two of said valves at a time.

The cylinder C which provides the power for vertically adjusting the cutter bar is provided at its upper end with a fitting 343, having a plug 302 mounted therein and provided with a suitable intake orifice 344. One end of the pipe 301 leading from the branch 298 of the cylinder A is connected to the fitting 343 and communicates with the intake orifice 344. A similar fitting 345 is secured to the lower head 287 of the cylinder C and has a similar plug 302 secured therein having an intake orifice 346 which communicates with a pipe 347, one end of which is in communication with the supply pipe 301. Thus, both ends of the cylinder C are in direct communication with the air supply whereby the pressure is equalized on both sides of the piston 288 thereof, as in the cylinders A and B.

Exhaust ports 348 and 349 are also provided in the cylinder heads 286 and 287, respectively, and communicate with pipes 351 and 352, which communicate with housings 353 and 354, having exhaust valves 355 and 356 mounted therein. These exhaust valves normally close a pair of exhaust ports 357 and 358.

The housings 353 and 354 are secured to a suitable bracket 360 shown secured to a collar 350 which supports the tracer or follower 254. The stems of the exhaust valves 355 and 356 extend beyond the inner ends of their respective housings, and are spaced apart to receive therebetween an actuating finger 359, shown provided upon an operating member 361 slidably mounted in the bracket 360. When the operating member 361 is moved in one direction, the exhaust valve 355 is opened, and when moved in the opposite direction, the exhaust valve 356 is opened. The operating member is normally retained in its neutral position, shown in Figure 11.

The control lever 341 and the control member 361 are so mounted upon the cutter bar that they may be conveniently manipulated by an operator standing in front of the machine. The control member 361 is preferably disposed directly back of the follower 254, and is provided at its lower end with an eye 362 adapted to receive the forefinger of the operator's right hand, while he grasps the shank of the follower 254 with the same hand. The operator's left hand will manipulate the control lever 341.

It will thus be seen that in the operation of the machine, the operator controls the movement of the follower or tracer 254 by manipulation of the control lever 341 so as to cause it to closely follow the contour of the pattern, whereby the actual work or power required to move the cutter bar is accomplished entirely by power. In operation, however, the operator usually grasps the shank of the follower with his right hand.

The control lever 341, as a result of its universal mounting in the bracket or supporting member 323, is so arranged that any one of the four valves shown in Figure 13 may be operated at will or if desired, two of said valves may be simultaneously actuated by tilting the lever 341 in certain directions. Thus, it will be seen that the cutter bar may be conveniently moved about at will by the simple manipulation of the control lever 341.

The operating means for the cutter bar is very sensitive because of the pistons of the various cylinders always being supported at opposite sides by the pressure fluid. Movement of the pistons is brought about by releasing the pressure from one end of the cylinder, whereby the pressure at the opposite side of the piston will cause it to move towards that end of the cylinder from which the pressure fluid is being released. The air is delivered into the cylinders through the restricted or metered intake orifices 307, 311, 324, 328, 344 and 346, provided in the intake nozzles 306. These passages or orifices are of a predetermined size so that the pressure fluid is delivered to the cylinders in a metered or measured flow. The exhaust orifices 312, 313, 329, 331, 348, and 349, provided in the nozzles 306, are relatively larger than the intake orifices so that the air may discharge from the cylinders faster than it is being supplied thereto, whereby the pistons travel at a constant speed, when the exhaust valves thereof are opened, which speed is controlled by the size of the intake orifices.

An important feature of the control mechanism resides in the fact that the various pistons are actuated by releasing pressure from the cylinders, which provides a more sensitive control than if the air was supplied to only one end of the cylinder against the piston and released from the same end, as is common practice. As hereinbefore stated, the pressure of the air in the cylinder is equal on both sides of the piston, because of the fact that both ends of each piston are in direct communication with the supply source, and the pressure in said cylinders is controlled by the adjustment of the pressure regulator 294 which may be adjusted to any predetermined pressure desired, as is well known.

The nozzles 306, four of which are shown provided on each cylinder, may readily be interchanged by simply removing the plugs 302 from their respective cylinder heads, after which the nozzles may readily be detached from said plugs and others substituted therefor. The sizes of the orifices in the intake nozzles may vary in the different cylinders, as said sizes are determined by the speed of movement desired for the respective pistons. For example, it may be found desirable that the vertical movement of the cutter bar be relatively faster than the horizontal movement or travel thereof. This may readily be accomplished by simply substituting nozzles 306 in the plugs 302 of the cylinder C having slightly larger orifices. In like manner, the nozzles provided in the cylinders A and B may be interchanged so that the pistons thereof may operate at the desired predetermined speed.

It is also to be understood that the control lever 341 is so mounted that when actuated, it is always moved in the direction in which it is desired to move the cutter bar. In other words, if the cutter bar is to be moved forwardly or in a direction towards the operator, the lever 341 is swung forwardly or towards the operator and, conversely, if the cutter bar is to be moved in a rearward direction, the lever 341 is swung rearwardly. In like manner, to move the cutter bar to the left, the lever 341 is swung to the left, and when the cutter bar is to be moved to the right, the lever 341 is moved to the right. The same is true with the operating member 361, which is so related to the valves 355 and 356, that when said member is moved upwardly, the cutter bar will move upward, and when pulled downwardly, the cutter bar will move downward.

*Two cylinder control*

Figures 16 to 32, inclusive, illustrate a pneumatic control adapted for moving the carriage forwardly and backwardly only. With this type of control, the cutter bar is manually moved lengthwise of the table, and also vertically.

As shown in Figure 16, a pair of cylinders D are provided, one at each end of the machine, and have their forward ends pivotally connected to suitable brackets 363, secured to the longitudinally extending frame members 263 and 264. As the cylinders D and their associated parts are of like construction, but one will be described in detail.

A head 364 is secured to the front end of the cylinder, as shown in Figure 29, and has a forked bracket 365 fixed thereto, which is pivotally connected to the bracket 363, as shown at 366. A piston head 367 is secured to the opposite end of the cylinder D and has a guide 368 therein for a piston rod 369, to the inner end of which is secured a piston 371. The opposite end of the piston rod is pivotally connected at 372 to an arm 373, having a split hub 374 rotatably fitting a bearing sleeve 375 suitably secured to the equalizer bar 251 by such means as set screws 376, as shown in Figure 18. The bearing sleeve 375 has a shoulder 377 at one end and has its opposite end fitting into a bracket 378 which is secured to the longitudinally extending frame member 264, and which bracket secures the equalizer bar 251 in the position shown in Figure 17.

The hub 374 of the arm 373 is fitted between the shoulder 377 and the one end of the bracket 378, as best shown in Figure 18, whereby the hub 374 of the arm 373 is held against longitudinal movement upon the bearing sleeve 375.

The hub 374 of the arm 373 is normally free to rotate upon the bearing sleeve 375, but is provided with means for locking it thereto, so that when the arm 373 is oscillated, rotary movement will be imparted to the equalizer bar 251.

The means for thus locking the hub 374 to the sleeve 375 of the equalizer bar, is best shown in Figures 19, 21, 29, and 30, and comprises a cam element 379 provided at its ends with pivots 381 and 382 adapted to be pivotally supported in suitable bearings provided in the heads 383 and a pair of bolts 384, mounted in suitable apertures provided in spaced lugs or flanges 385 provided on the hub 374 at opposite sides of a gap 386, which gap splits the hub longitudinally on one side whereby it may be contracted or expanded. The cam 379, when rotated in one direction, will force the flanges 385 together and thereby contract the hub so as to cause it to frictionally grip or clamp the sleeve 375, whereby the arm 373 becomes temporarily secured to the equalizer bar so that when the arm 373 is oscillated, rotary movement is imparted to the equalizer bar, whereby the arms 252 are correspondingly oscillated to thereby effect movement of the carriage in a forward or rearward direction.

The means provided for operating the cam element 379 is best shown in Figure 29, and comprises a cylinder E having heads 387 and 388 secured to the ends thereof. The head 387 is pivotally connected to a post or bracket 389 provided upon the arm 373. A piston 391 is reciprocally mounted within the cylinder E and has a piston rod 392 guidingly supported in the cylinder head 388, the outer end of which is pivotally connected to an arm 393 secured to the cam element 379. In Figure 29, the piston 391 is shown in an operative position, wherein the cam element 379 is actuated to secure the hub 374 to the sleeve 375. When the piston is moved upwardly, the cam 379 allows the hub 374 to expand, whereby its grip upon the sleeve 375 is released.

*Control means*

In the drawings, the pistons of the cylinders D and E are shown as being operated by air pressure. To thus operate the piston 371 of cylinder D, pipes 394 and 395 are connected to the opposite ends of the cylinder and to a pair of valve chambers 396 and 397, respectively. These valve chambers are formed in suitable housings 398 and 399, respectively, having pipes 401 connecting the upper ends thereof to a header 402, whereby communication is established between the header 402 and the valve chambers 396 and 397. Air under pressure is supplied to the header 402 from a pipe 403, connected to a pressure regulator 294, similar to the one shown in Figure 13, and to which air is supplied by the pipe 295.

Valves, generally indicated by the numerals 404 and 405, are mounted in the valve chambers 396 and 397, as shown in Figures 23 and 29. The valve chambers 396 and 397 are provided with lower portions 406 and 407 separated from the upper portions thereof by conical valve seats 408, each terminating at its lower end in a cylindrical bore 409. The lower valve chambers 406 and 407 are provided with exhaust ports 411 and 412, open to the atmosphere.

Each valve 404 and 405 has a conical head 413 adapted to engage the valve seats 408. A cylindrical portion 414 is provided directly below each valve head 413 and fit the bores 409. Below the cylindrical portions 414 of each valve, there is provided a tapered portion 415, which is relatively smaller in diameter than the bore 409 so that when one of the valves 404 or 405 are moved upwardly, as shown in Figure 23, an annular gap is provided between the walls of the bore 409 and the periphery of the tapered portion 415 of the valve 405, which gap gradually increases in size as the valve is moved upwardly to the position shown at the right hand side of Figure 23. When the valve 405 is thus positioned, the air pressure is released from the upper end of the cylinder D, and escapes through the exhaust port 412 which is then open.

Each valve 404 and 405 is further provided at its upper end with a head 416 adapted to be received in bores 417 provided in the housings 398 and 399. The bores 417 communicate with the pipes 401, leading to the distributor head 402, as indicated in Figure 29. The heads 416 of the valves fit the bores 417 so that when one of the valves is moved upwardly, and its head 416 enters its respective bore 417, the supply of air from the distributor head to the valve thus actuated is cut off, whereby the air may be released from the end of the cylinder D associated directly therewith, without discharging fresh air to the atmosphere. Suitable springs 418 normally hold the valves 404 and 405 in their normal closed positions, as shown in Figure 29.

The housings 398 and 399 are supported in a bracket 419, which is secured to one of the tubular connectors 204 of the cutter bar 20, as best shown in Figures 22 and 23. The stems of the valves 404 and 405 project below their housings 398 and 399, and are adapted to be engaged by a rocker 421 mounted upon a shaft 422 provided with a suitable operating handle 423, shown in Figure 22. The rocker 421 is normally in its neutral position, as shown in Figure 29, and is adapted to be rocked by manipulation of the handle 423, to thereby alternately engage the valve stems and actuate the valves, as clearly illustrated in Figure 23.

As hereinbefore stated, the construction of the valves 404 and 405, and their respective valve seats, is such that before one of the chambers 396 and 397 can be opened to the atmosphere, the head 416 of the valve which is being opened, will enter the bore 417 thereof and cut off the supply of fresh air to said chamber, after which the cylindrical portion 414 of the valve which is opened, will move out of engagement with the cylindrical bore 409. When the valve portion 414 thus moves out of the cylindrical bore 409, communication is established between the upper and lower chambers of the valve with the result that the air delivered to the valve chamber of the open valve, from one end of the cylinder D, will escape to the atmosphere. Such release of the air from the cylinder will cause the piston 371 to move in one direction, as a result of the air pressure impinging against the opposite end of the piston. This results because the other valve which remains engaged with its seat 408, permits free circulation of air through the bore 417 thereof, and the air chamber 396 communicating therewith, as a result of its head 416 being positioned below the bore 417, as clearly shown in Figure 29. Also, by reason of the portion 415 of each valve being tapered, as above described, the discharging of the air from the cylinder D may be accurately controlled.

Means is provided for limiting the movement of the rocker 421 so that the valve lever 423, when swung the limit of its movement in either direction, will permit the air to discharge from either end of the cylinder D at only a predetermined flow. In other words, said limiting means may be so adjusted that the air will discharge very slowly from the cylinder, or it may be positioned so that the air will quickly discharge therefrom, whereby the speed of travel of the piston 371 may be controlled at will.

The adjusting means, above referred to, is best shown in Figures 27 and 28, and comprises an abutment element 424 adapted to engage a vertically adjustable stop 425, slidably mounted in a guide 426 and having an adjusting screw 427 secured thereto. By rotating the adjusting screw 427, the stop 425 is raised or lowered with respect to the element 424, whereby the swinging movement of said element may be varied. By thus varying the swinging movement of the element 424, the swinging or rocking movement of the rocker 421 will be correspondingly varied to thereby vary the degree of opening of the valves 404 and 405.

The means provided for operating the piston 391 of the cylinder E consists of a valve mechanism, generally indicated by the numeral 428 in Figures 24 and 25. This valve mechanism comprises a casing 429 having a conical bore 431 adapted to receive a rotor 432, shown retained in the bore 431 by means of a screw 433 received in threaded engagement with the stem 434 provided on the rotor 432. The casing 429 is shown having a threaded extension 430 received in an aperture provided in a bracket 435 secured to one of the tubular connectors 204 of the cutter bar 20. A suitable nut 436 is received in threaded engagement with the extension 434 to thereby secure the casing to the bracket 435. A suitable compression spring 437 is shown having one end seated in the bottom of a counterbore provided in the extension 430, and having its opposite end seated against a cup-shaped washer 438 clamped between the end of the extension 434 of the rotor 432, and the head of the bolt 433.

An operating lever 439 is secured to the rotor 432, whereby the rotor may be conveniently rotated for purposes which will subsequently be described. A pipe 441 has one end connected to the casing 429 and its opposite end to the distributor head 402, whereby air under pressure is supplied to a recess 442 formed in the periphery of the rotor 432, as best shown in Figure 24. When the operating lever 439 is in the position shown in full lines in Figure 24, the recess 442 will establish communication between the supply pipe 441, and a pipe 443 leading from the casing 429 to the upper end of the cylinder E, as best shown in Figure 29.

When communication is thus established between the pipes 441 and 443, air under pressure is delivered into the upper end of said cylinder, with the result that the piston 391 is forced downwardly to substantially the position shown in Figure 29, whereby the cam 379 will contract the hub 374 of the arm 373, and thus secure said arm in fixed relation to the equalizer bar 251. Simultaneously, as the recess 442 is moved to the position shown in Figure 24, a groove 444 in the periphery of the rotor 432 will move into registration with the end of a pipe 445, connected to the lower end of the cylinder, whereby the air in the lower end of the cylinder E, below the piston 391, will exhaust to the atmosphere through the groove or duct 444.

When the lever 439 is moved to the dotted line position, shown in Figure 24, the recess 442 will establish communication between the supply pipe 441 and the pipe 445, whereby air under pressure is delivered to the lower end of the cylinder E to thereby force the piston upwardly to substantially the dotted line position shown in Figure 29. When the recess 442 is thus in communication with the pipes 441 and 445, a groove 446 in the periphery of the rotor 432 is moved into registration with the pipe 443 to thereby permit the escape of air in the upper portion of the cylinder to the atmosphere. It will thus be seen that by the simple manipulation of the lever 439, the hub 374 of the arm 373 may be alternately contracted and expanded, whereby it will function as a clutch band to thereby permit the equalizer bar to be relatively rotated about its axis, when the piston 371 of the cylinder D is reciprocated.

The fluid operated mechanism disclosed in Figures 16 to 32, as hereinbefore stated, is primarily for the purpose of moving the carriage backwardly and forwardly over the table. By means of the cylinder E and the clutch mechanism associated therewith, the carriage may be moved from its rearmost to its foremost position, or vice versa, in a step-by-step motion, resulting from the ratchet action obtained between the arm 373 and the equalizer bar 251, by the action of the piston of the cylinder E, and the reciprocal movement of the piston 371 of the cylinder D. When the follower 254 has been moved into proper position with respect to the pattern, indicated by the numeral 300 in Figure 17, it may be moved backwardly and forwardly therein by manipulation of the operating lever 423, the movement lengthwise of the cutter bar being manually performed by the operator grasping the follower 254 with one hand, and the cutter bar 20 with the other.

If it is found necessary to operate the follower at a location rearwardly of that shown in Figure 17, the carriage is moved backwardly by means of the piston 391 of the cylinder E operating in connection with the piston 371 of the cylinder D, as hereinbefore described. It will thus be seen that the forward and rearward movements of the carriage may be effected entirely by the power means, above described. If desired, however, the carriage may be manually moved forwardly and backwardly by disengaging the power operated control means therefrom. In Figure 16, we have shown a pair of cylinders D and E arranged at each end of the machine. It is to be understood, however, that in some machines a single pair of cylinders may suffice, while in others it may be advisable to use three or more.

Belt drive for spindles

Figures 33 and 34 illustrate a novel belt drive for operating the spindles 212 wherein four spindles are driven from a single motor. As best shown in Figure 34, an endless belt 447 has a running connection with a pair of adjacent spindle pulleys 226 and a twin pulley, generally indicated by the numeral 450. The twin pulley 450 comprises a pair of flanged pulleys 448 and 458 mounted upon a tubular bearing sleeve 449, secured to a bracket 451 having pivot bolts 452 and 453 pivotally supporting it upon the tubular member 55 of the carriage. Suitable bearing cups 454 are secured to the periphery of the tubular member 55 adapted to receive suitable anti-friction bearings receiving the conical terminals of the pivot bolts 452 and 453. The pivot bolt 453 has an enlarged head 455 shown received in threaded engagement with a threaded socket provided at the lower end of the tubular bearing member 449. A split clamping nut 456 is shown secured to the lower end of the tubular bearing member 449 to retain the pulley 450 upon said bearing member, as will readily be understood by reference to Figure 33. A suitable thrust washer 457 may be interposed between the clamping nut 456 and the adjacent end of the hub of the pulley 450, as is customary.

A belt 459 has a running connection with the pulley 458, and passes over a belt tightener pulley 461 and a flanged pulley 462, secured to the shaft of a suitable motor 463. The motor is suitably supported upon the rear end of one of the arms 95, whereby the weight thereof acts to counterbalance a portion of the weight of the cutter bar 20, as will readily be understood by reference to Figure 33.

The belt 459 also has a running connection with another idler pulley 461 and the pulley 458 of a similar twin pulley 450', disposed at the opposite side of the arm 95, to which the motor 463 is secured, as clearly illustrated in Figure 34. A belt 447, similar to the one at the opposite side of the arm 95, operatively connects the pulley 448 of the pulley 450' to an adjacent pair of spindle pulleys 226, as shown in Figure 34, whereby the motor 463 drives four spindles. Suitable belt tightener pulleys 464 are provided for taking up slack in the belts 447. These pulleys 464 are mounted upon studs 465 secured to slides 466 movable in guides 467 secured to the brackets 451. The belt tightener pulleys 464 are under spring tension by suitable means 468, as will readily be understood by reference to Figures 33 and 34.

A suitable tie rod or bar 469 operatively connects together the brackets 451 and arms 95, whereby they will always be retained in parallel relation to the arms 95, when the cutter bar 20 is moved lengthwise of the table. The belt tightener pulleys 461 of the motor belt are shown mounted on spring-actuated arms 471, whereby they constantly retain the belt 459 under tension.

The novel spindle drive disclosed in Figures 33 and 34 is very simple and makes it possible to drive four spindles with a single motor. The belts 447 are identical in construction and the belt 459 which operatively connects the pulleys 450 and 450' with the motor, is so arranged that it has substantially 180° contact with the pulleys 458 and 462, and which is also true of the belts 447, whereby slippage is substantially eliminated. The drive belt 459 may be quickly removed from the pulleys by simply releasing the belt tighteners 461 and, in like manner, the belts 447 may be detached from their spindle pulleys by simply removing the upper caps of the spindle heads, whereby the belts may readily be detached from the spindle pulleys 226, as hereinbefore described.

In the drawings, we have shown the power operated control means as being operated by air pressure, but it is to be understood that other pressure fluids may be used, where applicable, without departing from the scope of the invention.

We claim as our invention:

1. In a carving machine, means for supporting the work, a carriage mounted for forward and backward movement over said work supporting means, a tool-supporting bar, means movably supporting said bar on the carriage whereby it may be moved in a direction lengthwise of the work supporting means, power operated means for independently controlling the operation of the carriage and said tool-supporting bar, and manually operated means for controlling the operation of said power means.

2. In a carving machine, a table for supporting the work, a carriage mounted for forward and backward movement over the table, a tool-supporting bar, means pivotally supporting said bar on the carriage whereby it may be moved either horizontally or vertically relatively to said table, and a plurality of control elements on the tool-supporting bar for independently controlling the operations of the carriage and said tool-supporting bar.

3. In a carving machine, means for supporting the work, a carriage mounted for forward and backward traveling movement over said work supporting means, a tool-supporting bar mounted on the carriage and adapted for relative movement thereon lengthwise of the work supporting means, a plurality of power devices for operating the carriage and said tool-supporting bar, and control elements mounted on said bar and associated with said power devices, whereby the latter may be selectively operated to control the movements of the carriage and said tool-supporting bar.

4. In a carving machine, means for supporting the work, a carriage mounted for forward and backward traveling movement over said work supporting means, arms pivoted on said carriage and having a tool-supporting bar mounted thereon and whereby the latter may be moved lengthwise of the work supporting means, power devices for operating the carriage and said arms, and a plurality of control elements associated with said power devices for independently controlling the operations thereof.

5. In a carving machine, means for supporting the work, a carriage mounted for forward and backward traveling movement over said work supporting means, a plurality of arms pivoted on said carriage and having a tool-supporting bar mounted thereon and whereby said bar may be moved both vertically and lengthwise of the work supporting means, a plurality of fluid-operated devices connected to said arms and said carriage for operating the same, and a plurality of control elements associated with said devices whereby the latter may be operated independently of one another to thereby control the operations of the carriage and said tool-supporting bar.

6. In a machine of the class described, means for supporting the work, a carriage mounted for traveling movement over said work supporting means, a tool-supporting bar movably supported on the carriage, and means for operating the carriage comprising a cylinder and piston adapted for relative movement, means for supplying fluid under pressure to the cylinder at opposite sides of the piston, and means for selectively releasing the pressure fluid from either side of the piston through metered orifices, whereby the piston is relatively moved in the cylinder to thereby effect movement of the carriage.

7. In a machine of the class described, means for supporting the work, a carriage mounted for traveling movement over said work supporting means, and means for operating the carriage comprising a cylinder and piston adapted for relative movement, means for constantly supplying air at predetermined pressure to the cylinder at opposite sides of the piston, and means for selectively releasing air from the cylinder at either side of the piston through metered orifices, whereby the piston and cylinder are relatively moved to thereby effect traveling movement of the carriage.

8. In a machine of the class described, a work supporting table, a carriage mounted for traveling movement thereover, a tool-supporting bar movably supported on the carriage, and means for operating the carriage comprising a cylinder and piston adapted for relative movement, means for supplying air at predetermined pressure to both ends of the cylinder and at opposite sides of the piston, and a single control element for selectively releasing air from the cylinder at either side of the piston through metered orifices, whereby the piston and cylinder are relatively moved to thereby effect movement of the carriage.

9. In a machine of the class described, a work supporting table, a carriage mounted for traveling movement thereover, a tool-supporting bar movably mounted on the carriage, power means for operating the carriage and said tool-supporting bar comprising a plurality of cylinders each having a piston mounted therein, means for supplying air under pressure to opposite ends of each cylinder and whereby the pressure upon opposite sides of the pistons is normally equalized, and means for selectively releasing the air from the ends of said cylinders through metered orifices of predetermined size to thereby cause relative movement of the pistons therein, and whereby the operations of the carriage and said supporting bar may be controlled at will.

10. In a machine of the class described a work supporting table, a carriage mounted for traveling movement thereover, a tool-supporting bar movably mounted on the carriage, power means for operating the carriage and said tool-supporting bar comprising a plurality of cylinders each having a piston mounted therein, means for constantly supplying air at predetermined pressure to opposite ends of each cylinder, and whereby the pressure upon opposite sides of the pistons is normally equalized, and a single control element for selectively releasing the air from the ends of said cylinders to thereby cause relative movement of the pistons therein, and whereby the operations of the carriage and said supporting bar may be controlled at will.

11. In a machine of the class described, a work supporting table, a carriage mounted for traveling movement thereover, a tool-supporting bar mounted for horizontal and vertical movements on the carriage, power means for controlling the operations of the carriage and said tool-supporting bar comprising a plurality of operating devices, a control element operatively associated with certain of said operating devices for causing actuation of the latter and whereby the traveling movement of the carriage and the horizontal movement of the supporting bar may be controlled by the manipulation of a single control element, and a second control element associated with another of said devices for causing actuation thereof and whereby the vertical movement of the supporting bar may be controlled.

12. In a machine of the class described, a work supporting means, a carriage mounted for traveling movement thereover, a tool-supporting bar mounted for horizontal and vertical movements on the carriage, power means for controlling the operations of the carriage and said tool-supporting bar comprising a plurality of fluid operated devices, a control element operatively associated with certain of said fluid operated devices for causing actuation of the latter, and whereby the traveling movement of the carriage and the horizontal movement of the supporting bar may be controlled by the manipulation of a single control element, and a second control element associated with another of said fluid operated devices for causing actuation thereof and whereby the vertical movement of the supporting bar may be controlled.

13. In a machine of the class described, a carriage mounted for traveling movement and comprising a plurality of spaced parallel arms mounted for horizontal and vertical swinging movements, a cutter bar pivotally supported on the swinging ends of said arms, said cutter bar being composed of a plurality of cutter heads each having oppositely disposed cylindrical extensions, and tubular members fitting said cylindrical extensions and cooperating with said heads to provide a unitary structure.

14. In a machine of the class described, a carriage mounted for traveling movement and comprising a plurality of pivoted arms, a cutter bar pivotally supported on said arms and adapted for movement therewith, said cutter bar being composed of a plurality of cutter heads rigidly connected together by a series of cylindrical members to thereby provide a unitary structure, and means on said cylindrical members pivotally engaged with said arms and whereby the cutter bar may be rotatively adjusted with respect to said arms.

15. In a machine of the class described, a carriage comprising a main supporting member having a plurality of spaced parallel arms mounted for swinging movement thereon, both horizontally and vertically, a cutter bar pivotally supported on said arms, said cutter bar being composed of a plurality of cutter heads rigidly connected together by a series of tubular members to thereby provide a unitary structure, each cutter head having a tool-supporting spindle mounted therein each of which is provided with a pulley, and means for temporarily locking said spindles against rotation, when securing tools therein or removing them therefrom.

16. In a machine of the class described, a work supporting table, a carriage mounted for traveling movement thereover and comprising a plurality of spaced parallel arms mounted for swinging movement, a cutter bar pivotally connected to the outer ends of said arms and composed of a plurality of spaced cutter heads rigidly connected together by tubular members interposed therebetween to provide a unitary structure, a tool-supporting structure in each head, and said tubular connecting members being readily detachable from the cutter heads whereby the overall length of the cutter bar and the spacing between said cutter heads may be varied.

17. In an apparatus of the class described, a work supporting table, a carriage mounted for traveling movement thereover and comprising a main supporting member extending lengthwise of the machine, a plurality of arms pivotally mounted on said supporting member and extending forwardly therefrom in spaced parallel relation, a cutter bar pivotally connected to the outer ends of said arms and comprising a plurality of spaced cutter heads, a tool-supporting spindle in each cutter head provided with a pulley, said spindles being arranged in pairs, an endless belt for driving each pair of spindles, each of said belts having a running connection with the pulleys of their respective spindles and with a drive pulley mounted on said supporting member, and a motor supported on one of said arms rearwardly of said supporting member and having a belt operatively connecting it with the drive pulleys of adjacent spindle belts, whereby each motor will operate four spindles.

18. In an apparatus of the class described, a work supporting table, a carriage mounted for traveling movement thereover and comprising a supporting member extending lengthwise of the machine, a plurality of arms pivotally mounted on said supporting member and extending forwardly therefrom in spaced parallel relation, a cutter bar pivotally connected to the outer ends of said arms and comprising a plurality of spaced cutter heads, a tool-supporting spindle in each cutter head provided with a pulley, said spindles being arranged in pairs, an endless belt for driving each pair of spindles, each of said belts having a running connection with the pulleys of their respective spindles and with a drive pulley mounted on said supporting member, a belt tightener engaged with each belt, and a motor supported on the carriage rearwardly of said supporting member and having a belt operatively connecting it with the drive pulleys of adjacent spindle belts, whereby each motor will operate four spindles.

19. In an apparatus of the class described, a work supporting table, a carriage mounted for traveling movement thereover and comprising a supporting member extending lengthwise of the machine, a plurality of arms mounted on said supporting member and extending forwardly therefrom in spaced parallel relation, a cutter bar connected to the outer ends of said arms and comprising a plurality of spaced cutter heads, a tool-supporting spindle in each cutter head provided with a pulley, said spindles being arranged in pairs, an endless belt for driving each pair of spindles, each of said belts having a running connection with the pulleys of their respective spindles and with a drive pulley on said supporting member, a spring-actuated belt tightener pulley engaged with each belt, a motor fixedly secured to one of said arms rearwardly of said supporting member, said arm being disposed between a pair of said spindle belts, a belt operatively connecting said motor with the drive pulleys of adjacent spindle belts, whereby each motor will operate four spindles, and means for taking up slack in the motor belt.

20. In a machine of the class described, a carriage mounted for traveling movement and comprising a plurality of arms mounted for horizontal and swinging movements, a cutter bar pivotally mounted on the swinging ends of said arms, said cutter bar being composed of a plurality of cutter heads each having oppositely disposed extensions, and hollow members fitting said extensions and cooperating with the cutter heads to provide a unitary, rigid structure.

21. In an apparatus of the class described, work-supporting means, a carriage mounted for traveling movement thereover and pivotally supporting a cutter bar, said cutter bar being composed of a plurality of cutter heads, each having oppositely disposed extensions, and members fitting said extensions and cooperating with the cutter heads to provide a unitary, rigid cutter bar.

22. In an apparatus of the class described, a work-supporting table, a carriage mounted for traveling movement thereover and comprising a plurality of pivoted arms, a cutter bar pivotally connected to said arms and comprising a plurality of spaced cutter heads, a tool-supporting spindle in each cutter head provided with a pulley, said spindles being arranged in pairs, an endless belt for driving each pair of spindles, each of said belts having a running connection with the pulleys of their respective spindles and with a drive pulley mounted on the carriage, a motor supported on the carriage at the side thereof opposite from the cutter bar, and a belt operatively connecting the motor with the drive pulleys of adjacent spindle belts.

JULIAN N. KIRBY.
RAYMOND G. GILLE.